US007702159B2

(12) United States Patent
Derks et al.

(10) Patent No.: US 7,702,159 B2
(45) Date of Patent: Apr. 20, 2010

(54) SYSTEM AND METHOD FOR DETECTING SIMILAR DIFFERENCES IN IMAGES

(75) Inventors: Patrick Joseph Derks, Seattle, WA (US); Andrew C. Seres, Redmond, WA (US); Jidesh Veeramachaneni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/036,971

(22) Filed: Jan. 14, 2005

(65) Prior Publication Data

US 2006/0159347 A1  Jul. 20, 2006

(51) Int. Cl.
*G06K 9/68* (2006.01)
*G06F 9/44* (2006.01)
*G06F 3/00* (2006.01)

(52) U.S. Cl. ........................ 382/221; 715/762; 715/763; 717/121; 717/124

(58) Field of Classification Search ................ 382/209, 382/218, 219, 221, 224, 217; 715/200, 210, 715/223, 243, 249, 250, 255, 762–764; 717/125, 717/131, 122; 714/37, 38, 46, 48, E11.208
See application file for complete search history.

(56) References Cited

U.S. PATENT DOCUMENTS

| | | | | |
|---|---|---|---|---|
| 5,781,720 A * | 7/1998 | Parker et al. | .................. | 714/38 |
| 5,835,634 A * | 11/1998 | Abrams | ...................... | 382/222 |
| 5,982,931 A * | 11/1999 | Ishimaru | ...................... | 382/218 |
| 6,226,407 B1 * | 5/2001 | Zabih et al. | ................. | 382/209 |
| 6,721,461 B1 * | 4/2004 | Nichani | ...................... | 382/270 |
| 6,836,568 B1 * | 12/2004 | Morishita | .................... | 382/219 |
| 7,296,184 B2 * | 11/2007 | Derks et al. | .................... | 714/25 |
| 7,334,219 B2 * | 2/2008 | Cebula et al. | ................ | 717/124 |
| 7,379,600 B2 * | 5/2008 | Derks et al. | ................. | 382/218 |
| 7,388,979 B2 * | 6/2008 | Sakai et al. | .................. | 382/218 |
| 7,398,469 B2 * | 7/2008 | Kisamore et al. | ............ | 715/704 |
| 2002/0048393 A1 * | 4/2002 | Oosawa | ...................... | 382/132 |
| 2003/0031356 A1 * | 2/2003 | Sasa | ........................... | 382/145 |
| 2003/0152275 A1 * | 8/2003 | Chung et al. | ................ | 382/218 |
| 2004/0075699 A1 * | 4/2004 | Franchi et al. | .............. | 345/860 |
| 2004/0223648 A1 * | 11/2004 | Hoene et al. | ................ | 382/218 |
| 2006/0110047 A1 * | 5/2006 | Reissman et al. | ........... | 382/218 |

OTHER PUBLICATIONS

Mazo, J.E.; Saltzberg, B.R.; Error-burst detection with tandem CRCs. Communications, IEEE Transactions on Aug. 1991, vol. 39, Issue 8, pp. 1175-1178.*

* cited by examiner

*Primary Examiner*—Vikkram Bali
*Assistant Examiner*—Julian D Brooks
(74) *Attorney, Agent, or Firm*—Workman Nydegger

(57) ABSTRACT

A system and method for detecting differences in images and identifying groups of images with similar differences detected is provided. To this end, an image comparator may be operably coupled to a pixel comparator for comparing pixels of the baseline image with corresponding pixels of one or more sample images to detect differences between the pixels compared. A derivative difference processor may be also provided which may be operably coupled to the pixel comparator for determining a difference region of pixels detected as different by the pixel comparator in the sample images. An image sorter may also be provided which may be operably coupled to the difference derivative processor for grouping together sample images that have a similar difference region determined by the derivative difference processor.

17 Claims, 4 Drawing Sheets

SYSTEM AND METHOD FOR DETECTING SIMILAR DIFFERENCES IN IMAGES

FIELD OF THE INVENTION

The invention relates generally to computer systems, and more particularly to a system and method for detecting similar differences in images.

BACKGROUND OF THE INVENTION

Software development usually requires testers to evaluate the quality of a software product in many ways, including any content such as images incorporated in a software build or generated by execution of a software build. Traditional testing of such images may involve verifying that every pixel of a sample image is identical to the corresponding pixel of a baseline image to detect any unintended changes made to a user interface screen during software development. Although functional, this process for identifying changes made to a user interface screen during software development is cumbersome. Moreover, it is very difficult using this process to identify and perform operations needed to correct such unintended changes made to a user interface image.

Another problem with this approach is that it does not account for large numbers of images that may undergo the same or similar sequence of unintended changes from a baseline image across a progression of software builds. Although the addition of new or modified software code to a build may result in numerous images undergoing the same or similar change, the differences for each image may be individually detected, analyzed and corrected. Unfortunately, such a process may fail to leverage the analytic or corrective operations applied to one image for other images with the same or similar change.

What is needed is a way for more efficiently detecting differences in images where numerous images may undergo the same or similar change from a baseline image. Such a system should be able to leverage the analysis and operations applied to one image for other images with the same or similar change.

SUMMARY OF THE INVENTION

Briefly, the present invention provides a system and method for detecting differences in images and identifying groups of images with similar differences detected. The present invention may compare one or more sample images to a baseline image to detect differences between the images, determine a difference region of pixels detected as different in each sample image, and group any sample images together that have a similar difference region. To this end, an image comparator may be operably coupled to a pixel comparator for comparing pixels of the baseline image with corresponding pixels of one or more sample images to detect differences between the pixels compared. A derivative difference processor may be also provided which may be operably coupled to the pixel comparator for determining a difference region of pixels detected as different by the pixel comparator in the sample images. An image sorter may also be provided which may be operably coupled to the difference derivative processor for grouping together sample images that have a similar difference region determined by the derivative difference processor.

Furthermore, a test framework system may be operably coupled to the image comparator for providing instructions to the image comparator for comparing the baseline image and the sample images. In one embodiment, the test framework system may be operably coupled to a data store including the sample images, and the test framework system may submit sample images to the image comparator for comparison with one or more baseline images. In another embodiment, the test framework system may provide instructions to the image comparator for obtaining the sample images from the data store. The image comparator may then obtain sample images, obtain one or more baseline images, compare the images, identify groups of sample images with similar differences, and group together sample images that have similar differences.

Advantageously, the system and method may detect differences in sample images when compared with one or more baseline images and group images together that have similar differences. The system and method may efficiently detect differences in sample images, such as those from a progression of software builds, where numerous images may undergo the same or similar change from a baseline image. Furthermore, by grouping images together that have similar differences detected, the system and method may allow bulk operations to be performed on a group of images without requiring individual analysis of the differences detected in each sample image belonging to the group from a baseline image.

Other advantages will become apparent from the following detailed description when taken in conjunction with the drawings, in which:

DETAILED DESCRIPTION

Exemplary Operating Environment

Figure 1:
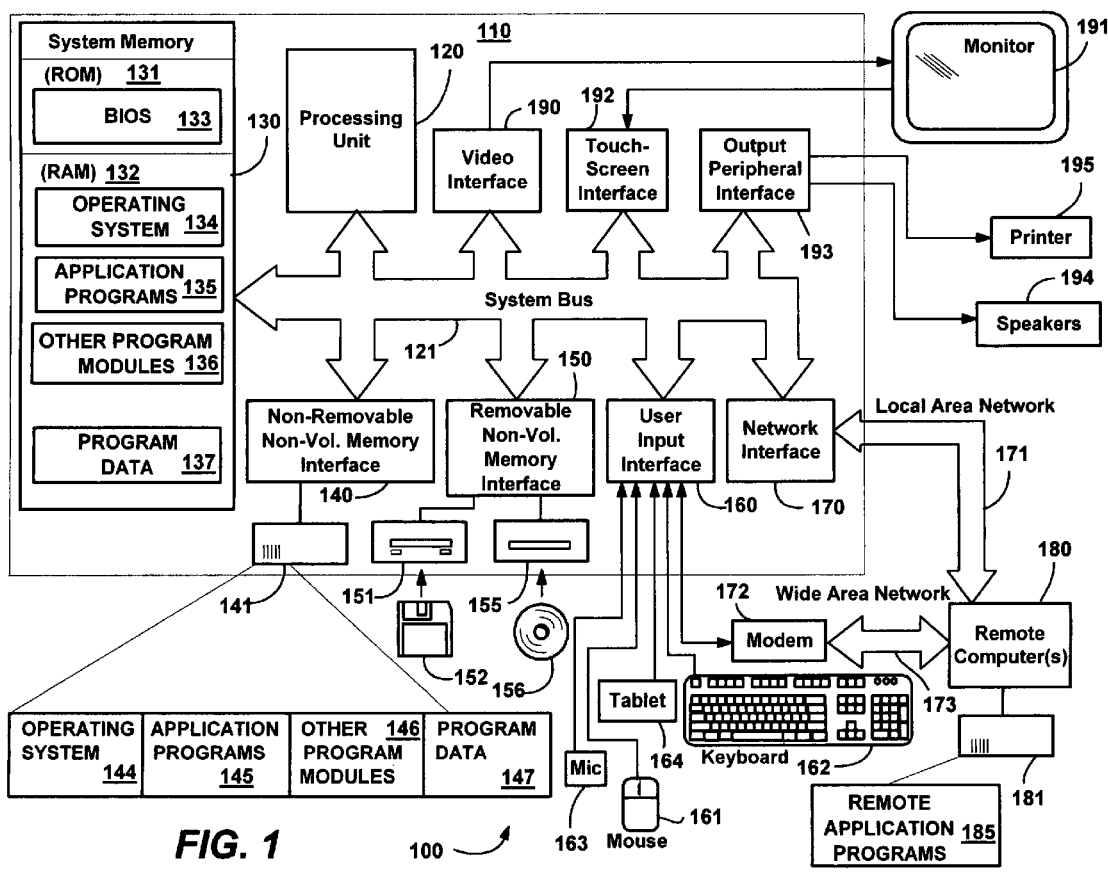
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to:

personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Detecting Differences in Images

The present invention is generally directed towards system and method for detecting differences in sample images when compared with one or more baseline images and grouping images together that have similar differences. The system and method may efficiently detect differences in sample images, such as those from a progression of software builds, where numerous images may undergo the same or similar change from a baseline image. The software build may include a set of executable assemblies which may generate images rendered by the software on a screen or display such as a sequence of graphical user interface screens. As defined herein, an image means any visual media such as a video image, a part of an image, a graphical user interface screen, any visual primitives to build a graphical user interface screen including, a control, a frame, a window, and so forth. For example, if there are thousands of baseline images for a software build that include a tab from a menu and a change occurs to the menu in a new build of the software, then the thousands of baseline images that include this menu may have the same differences from the baseline images. The present invention may group together these images that have the same differences. As will be seen, by grouping images together that have similar differences detected, the system and method may allow bulk operations to be performed on a group of images without requiring individual analysis of the differences detected in each sample image belonging to the group from a baseline image. As will be understood, the various block diagrams, flow charts and scenarios described herein are only examples, and there are many other scenarios to which the present invention will apply.

Figure 2:
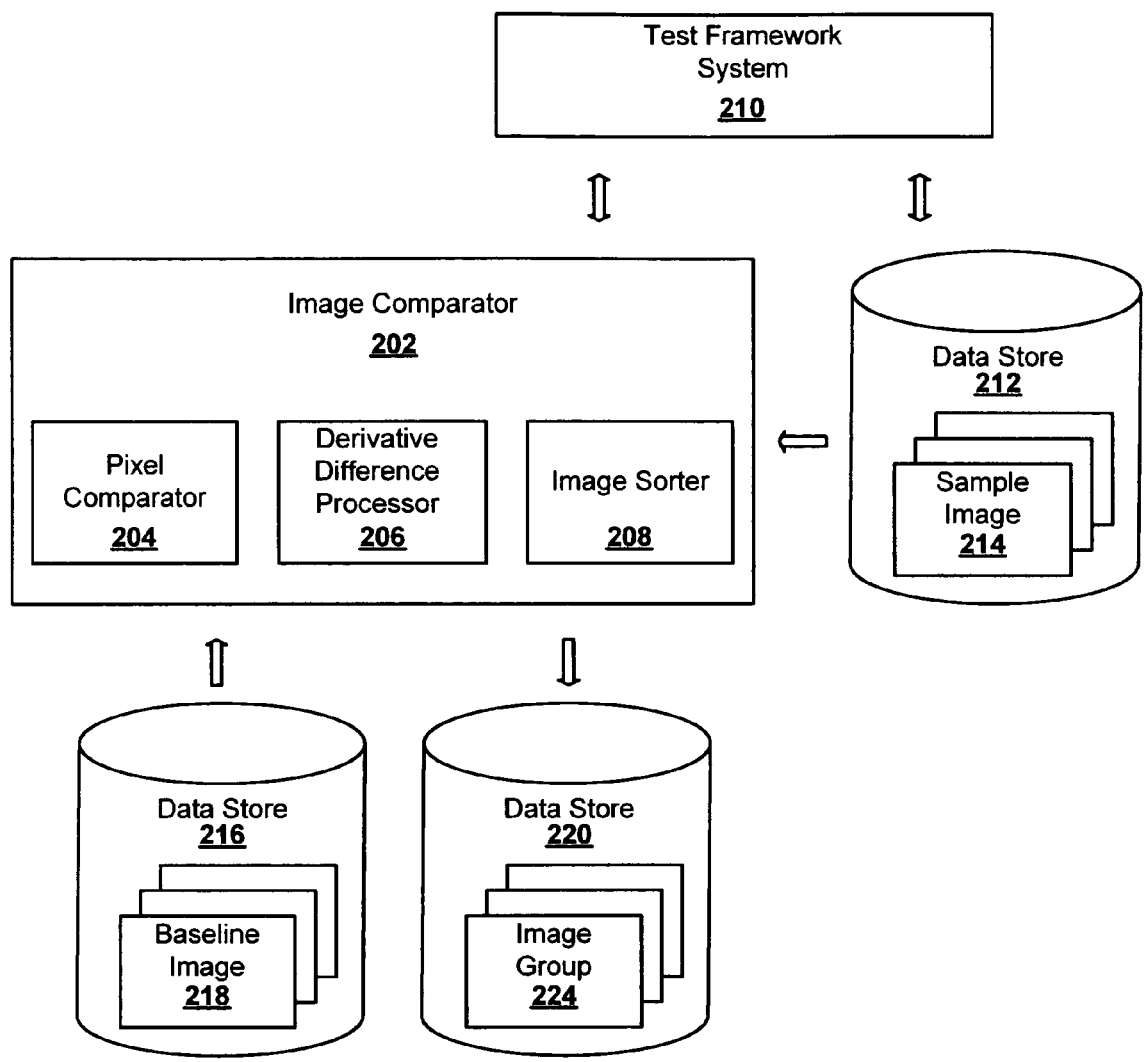
FIG. 2 is a block diagram generally representing an exemplary architecture of system components for detecting differences in images and identifying groups of images with similar differences detected, in accordance with an aspect of the present invention.

Turning to FIG. 2 of the drawings, there is shown a block diagram generally representing an exemplary architecture of system components for detecting differences in images and identifying groups of images with similar differences detected. Those skilled in the art will appreciate that the functionality implemented within the blocks illustrated in the diagram may be implemented as separate components or the functionality of several or all of the blocks may be implemented within a single component. For example, the functionality for the derivative difference processor 206 of the image comparator 202 may be implemented as a separate component.

The image comparator 202 may accept any image, including any visual primitive used in a graphical user interface. The image comparator 202 may include an operably coupled pixel comparator 204, an operably coupled derivative difference processor 206, and an operably coupled image sorter 208. The pixel comparator 204 may compare the pixels of images, such as the pixels of a baseline image and a sample image, and may record the results of pixel comparisons, including any differences detected. The difference derivative processor 206 may compare any differences detected among images, for example those differences that may be detected from comparing sample images to a baseline image, to determine the differences of those differences that were detected from comparing the pixels of the images. The image sorter 208 may identify groups of images with similar differences determined, such as identical differences that may be detected from comparison of sample images with a baseline image. In general, the image comparator 202, the pixel comparator 204, the derivative difference processor 206, and the image sorter 208 may be any type of executable software code such as a kernel component, an application program, a linked library, an object, and so forth.

A test framework system 210 may be operably coupled to the image comparator 202 and to a data store 212 for providing requests to the image comparator 202 for comparing images to detecting differences in the images. The test framework 210 may include the capability to submit sample images to the image comparator 202 for comparison with one or more baseline images. In one embodiment, the test framework system 210 may obtain one or more sample images 214 from a data store 212 and the image comparator 202 may retrieve one or more baseline images 218 from a data store 216. In another embodiment, the test framework system 210 may provide instructions to the image comparator 202 for obtaining the one or more sample images 214 from the data store. After determining the difference of the differences of images, each group of images with similar differences may be persistently stored as an image group 224 in a data store 220. In an alternate embodiment, the sample images 214, the baseline images 218, and the groups of images 224 may be stored in the same data store or may be stored in two or more separate data stores. In general, the test framework may include an application programming layer to support testing applications and may include operating system components.

Figure 3:
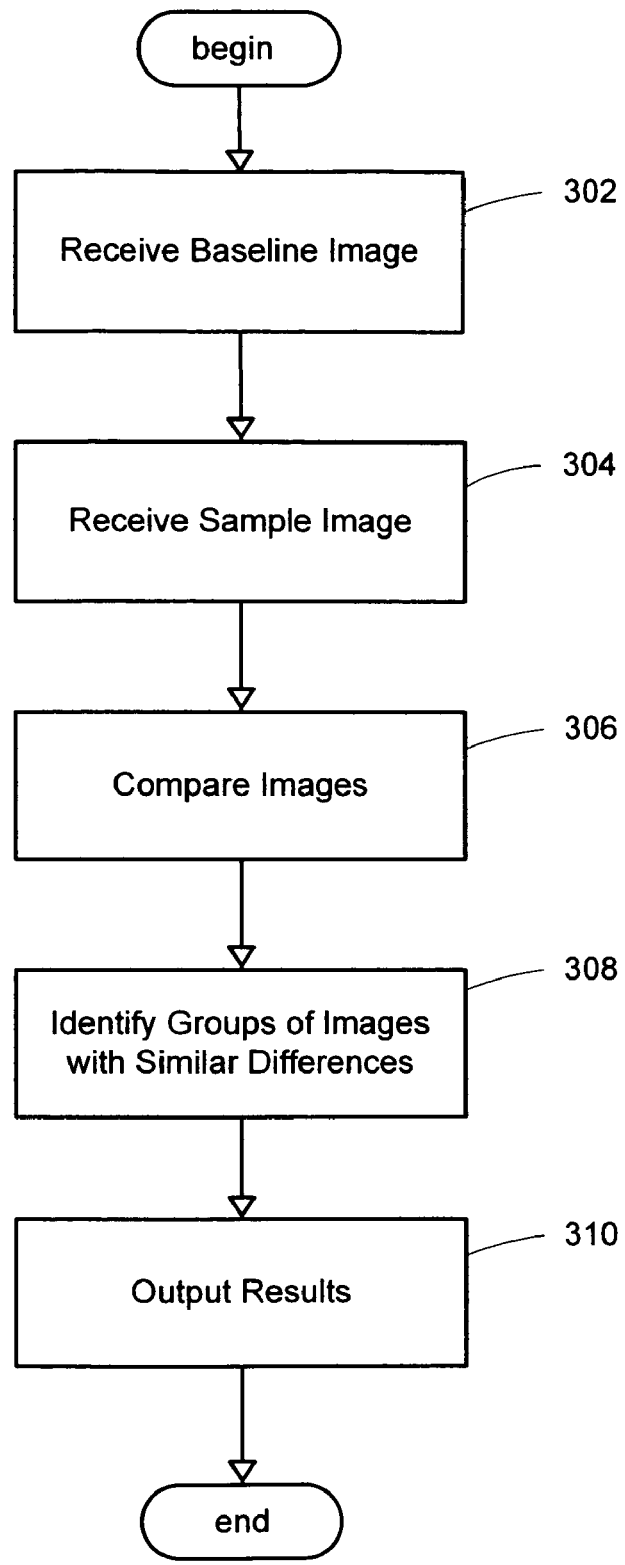
FIG. 3 is a flowchart generally representing the steps undertaken in an embodiment for detecting differences in images and identifying groups of images with similar differences detected, in accordance with an aspect of the present invention.

FIG. 3 presents a flowchart generally representing the steps undertaken in an embodiment for detecting differences in images and identifying groups of images with similar differences detected. At step 302, a baseline image may be received. At step 304, a sample image may be received. The baseline image and the sample image may each be any type of image including any visual primitive used in a graphical user interface. In an embodiment, the baseline image may be generated from a build of software for a system such as a mobile device or may be synthesized using a design tool. In an embodiment, the sample image may be generated from running an automated test script or program on a system such as a mobile device loaded with a new build of the software.

Next, one or more sample images may be compared with one or more baseline images at step 306. To do so, a pixel of one image may be compared to a corresponding pixel in another image. In one embodiment, a corresponding pixel may be a pixel with the same relative location within the image. To compare the pixels, for example, the sum of the absolute difference between the R, G, B and alpha channels may be determined in one embodiment. After comparing images, groups of images with similar differences may be identified at step 308. In one embodiment, groups of sample images with identical differences detected from comparison with one or more baseline images may be identified. Once groups of images with similar differences have been identified, the results of detecting differences in images and identifying groups of images with similar differences detected may be output at step 310. In one embodiment, images with similar difference regions may be persistently stored as image groups. In another embodiment, an indication of such image groups may be persistently stored, for example, as a file.

Figure 4:
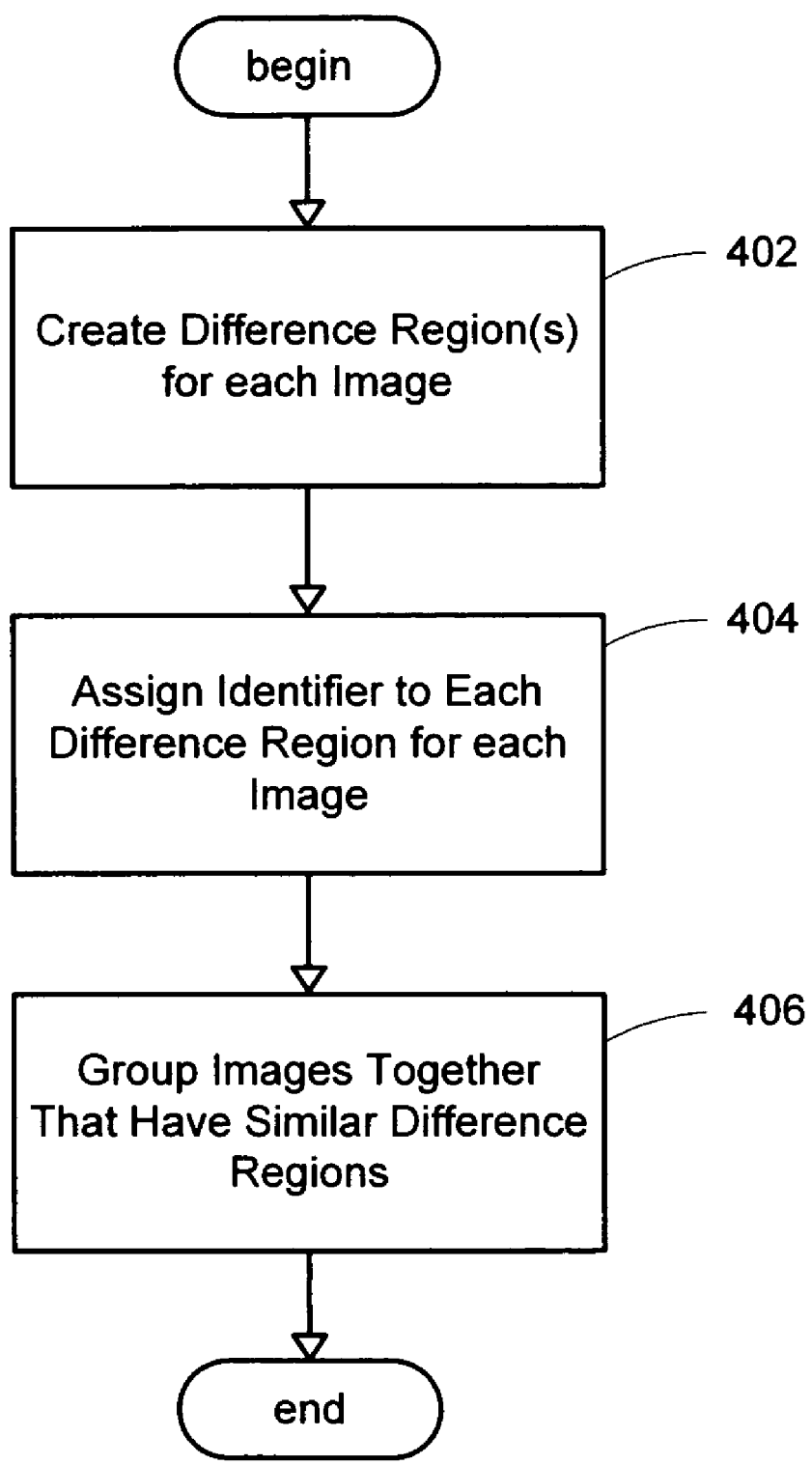
FIG. 4 is a flowchart generally representing the steps undertaken in an embodiment to identify groups of images with similar differences detected, in accordance with an aspect of the present invention.

FIG. 4 presents a flowchart generally representing the steps undertaken in an embodiment to identify groups of images with similar differences detected from comparison with one or more other images as indicated at step 308 of FIG. 3. At step 402, one or more difference regions may be created for each image compared. In one embodiment, each region of adjacent pixels in a sample image that may have a different value from the corresponding pixels in a baseline image, such as a different channel value, may be identified and a bounding rectangle that surrounds that region may be generated for identifying that region. After one or more difference regions have been identified for each image compared, an identifier may be assigned to each difference region at step 404 for each image compared. Note that there may be similar or identical difference regions among several images. In one embodiment, an identifier may be assigned by calculating a Cyclical Redundancy Check ("CRC") for the pixel values of the pixels in the difference region. For example, the value for each pixel may be the sum of the values of the R, G, B and alpha channels. Those skilled in the art will appreciate that any well-known method for calculating a CRC may be used. Once an identifier may be assigned to each difference region for each image, the images may be grouped together into groups of images with similar difference regions at step 406. In one embodiment, a group may be formed of any images with an identifier indicating that the difference region may have identical difference detected. Processing is finished after the images may be sorted into groups of images with similar difference regions.

As can be seen from the foregoing detailed description, the present invention provides an improved system and method for detecting differences in sample images when compared with one or more baseline images and grouping images together that have similar differences. The system and method may efficiently detect differences in sample images, such as those from a progression of software builds, where numerous images may undergo the same or similar change from a baseline image. Furthermore, by grouping images together that have similar differences detected, the system and method may allow bulk operations to be performed on a group of images without requiring individual analysis of the differences detected in each sample image belonging to the group from a baseline image. The system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for detecting similar differences between a plurality of images, comprising a processor and memory storing the following components:
   a pixel comparator that receives a baseline image of a user interface of a software product and a plurality of sample images of the user interface that are generated during a progression of builds of the software product, and compares pixels of the baseline image with corresponding pixels of the plurality of sample images to detect differences between the pixels compared;
   a derivative difference processor operably coupled to the pixel comparator for determining a difference region of pixels detected as different by the pixel comparator in the plurality of sample images, wherein the derivative difference processor performs the following steps:
      for each of the plurality of sample images, defining one or more difference regions within the sample image, wherein a difference region comprises a plurality of adjacent pixels of the sample image that are each different than the corresponding pixel of a plurality of adjacent pixels of the baseline image; and
      assigning an identifier to each of the one or more difference regions wherein a difference region of a first sample image is assigned the same identifier as a difference region of a second sample image if the plurality of adjacent pixels of the first sample image have differences similar to the plurality of adjacent pixels of the second sample image;
   an image sorter operably coupled to the difference derivative processor for grouping the plurality of sample images into groups having similar difference regions as determined by the derivative difference processor, wherein the image sorter performs the following steps:
      comparing the identifiers of the one or more difference regions for each of the plurality of sample images to determine that two or more of the plurality of sample images have similar difference regions; and
      upon determining that two or more of the plurality of sample images have similar difference regions, grouping the two or more sample images together; and
   a component for performing operations on the group of two or more sample images by analyzing a set of similar difference regions corresponding to the group rather than performing an analysis on each of the sample images individually.

2. The system of claim 1 further comprising an image comparator operably coupled to the pixel comparator for providing the baseline image and the plurality of sample images to the pixel comparator.

3. The system of claim 2 further comprising a test framework system operably coupled to the image comparator for providing instructions to the image comparator to compare the baseline image and the plurality of sample images.

4. The system of claim 2 further comprising a data store operably coupled to the image comparator, the data store including at least the baseline image.

5. The system of claim 2 further comprising a data store operably coupled to the image comparator, the data store including the plurality of sample images.

6. The system of claim 2 further comprising a data store operably coupled to the image comparator, the data store including an indication of groups of the plurality of sample images.

7. The system of claim 6 wherein the indication of the groups of the plurality of sample images comprises groups of the plurality of sample images.

8. A method for detecting similar differences between a plurality of images in a computer system, comprising:
- receiving, at a processor of the computer system, a baseline image of a user interface of a software product and a plurality of sample images of the user interface that are generated during a progression of builds of the software product;
- comparing, by the processor, pixels of the baseline image with corresponding pixels of the plurality of sample images to detect differences between the pixels compared;
- for each of the plurality of sample images, defining, by the processor, one or more difference regions within the sample image, wherein a difference region comprises a plurality of adjacent pixels of the sample image that are each different than the corresponding pixel of a plurality of adjacent pixels of the baseline image;
- assigning, by the processor, an identifier to each of the one or more difference regions wherein a difference region of a first sample image is assigned the same identifier as a difference region of a second sample image if the plurality of adjacent pixels of the first sample image have differences similar to the plurality of adjacent pixels of the second sample image;
- comparing, by the processor, the identifiers of the one or more difference regions for each of the plurality of sample images to determine that two or more of plurality of the sample images have similar difference regions;
- upon determining that two or more of the plurality of sample images have similar difference regions, grouping, by the processor, the two or more sample images together; and
- performing, by the processor, operations on the group of two or more sample images by analyzing a set of similar difference regions corresponding to the group rather than performing an analysis on each of the sample images individually.

9. The method of claim 8 wherein comparing pixels of the baseline image with corresponding pixels of the plurality of sample images to detect differences between the pixels compared comprises determining the sum of the absolute difference between the R, G, B and alpha channels of the pixels compared.

10. The method of claim 8 wherein the plurality of sample images are grouped into two or more different groups wherein the sample images of each group have similar difference regions, the method further comprising identifying the two or more different groups.

11. The method of claim 10 wherein the sample images of each group have identical difference regions.

12. The method of claim 8 wherein assigning the identifier to each of the one or more difference regions comprises assigning the same identifier to any difference region that has identical differences detected from pixel comparisons.

13. The method of claim 10 further comprising outputting an indication of the two or more different groups.

14. The method of claim 13 wherein outputting the indication comprises persistently storing the two or more different groups.

15. The method of claim 8 wherein the baseline image corresponds to a version of the software product prior to one or more changes being made to the source code of the software product and wherein the plurality of sample images correspond to the software product after the one or more changes have been made to the source code of the software product such that the difference regions of each of the two or more sample images that are grouped together resulted from the one or more changes to the source code of the software product.

16. The method of claim 8 wherein the baseline image and the plurality of sample images comprise one or more of the following components of the user interface:
- a control;
- a frame; and
- a window.

17. A computer-readable storage medium having computer-executable instructions which when executed perform a method comprising:
- receiving a baseline image of a user interface of a software product and a plurality of sample images of the user interface that are generated during a progression of builds of the software product;
- comparing pixels of the baseline image with corresponding pixels of the plurality of sample images to detect differences between the pixels compared;
- for each of the plurality of sample images, defining one or more difference regions within the sample image, wherein a difference region comprises a plurality of adjacent pixels of the sample image that are each different than the corresponding pixel of a plurality of adjacent pixels of the baseline image;
- assigning an identifier to each of the one or more difference regions wherein a difference region of a first sample image is assigned the same identifier as a difference region of a second sample image if the plurality of adjacent pixels of the first sample image have differences similar to the plurality of adjacent pixels of the second sample image, wherein the identifier is assigned to each of the one or more difference regions by calculating a cyclic redundancy check for pixel values of the plurality of adjacent pixels in the corresponding difference region;
- comparing the identifiers of the one or more difference regions for each of the plurality of sample images to determine that two or more of plurality of the sample images have similar difference regions;
- upon determining that two or more of the plurality of sample images have similar difference regions, grouping the two or more sample images together; and
- performing operations on the group of two or more sample images by analyzing the a set of similar difference regions corresponding to the group rather than performing an analysis on each of the sample images individually.

* * * * *